US00RE44544E

(19) United States
(12) Reissued Patent
Ricco et al.

(10) Patent Number: US RE44,544 E
(45) Date of Reissued Patent: Oct. 22, 2013

(54) ELECTROINJECTOR FOR CONTROLLING FUEL INJECTION IN AN INTERNAL-COMBUSTION ENGINE

(75) Inventors: Mario Ricco, Valenzano (IT); Sisto Luigi De Matthaeis, Valenzano (IT); Antonio Gravina, Valenzano (IT); Sergio Stucchi, Valenzano (IT)

(73) Assignee: C. R. F. Societa Consortile per Azioni, Orbassano (IT)

(21) Appl. No.: 12/763,479

(22) Filed: Apr. 20, 2010

Related U.S. Patent Documents

Reissue of:
(64) Patent No.: 7,360,528
Issued: Apr. 22, 2008
Appl. No.: 11/452,391
Filed: Jun. 14, 2006

U.S. Applications:
(63) Continuation of application No. 11/109,789, filed on Apr. 20, 2005, now Pat. No. 7,131,428.

(30) Foreign Application Priority Data

Nov. 12, 2004 (EM) ..... 04425841

(51) Int. Cl.
*F02M 37/04* (2006.01)

(52) U.S. Cl.
USPC ..... 123/500; 123/300

(58) Field of Classification Search
USPC ..... 123/299, 300, 467, 500, 501
See application file for complete search history.

(56) References Cited

U.S. PATENT DOCUMENTS 4,688,536 A 8/1987 Mitsuyasu et al.
4,704,999 A 11/1987 Hashikawa et al.
4,732,129 A 3/1988 Takigawa et al.

(Continued)

FOREIGN PATENT DOCUMENTS

DE 4310984 3/1993
EP 0570986 11/1993

(Continued)

OTHER PUBLICATIONS

European Search Report dated Apr. 25, 2005.

(Continued)

*Primary Examiner* — John Kwon
(74) *Attorney, Agent, or Firm* — Crowell & Moring LLP

(57) ABSTRACT

An electroinjector is provided for controlling fuel injection in an internal-combustion engine. The electroinjector includes an electroactuator, an injection nozzle, and a pin, which is movable along an opening stroke and a closing stroke for opening/closing the nozzle under the control of the electroactuator and according to the supply pressure of the fuel into the electroinjector. A first electrical command and at least a second electrical command, which are sufficiently close to one another as to displace the pin with a profile of motion without any discontinuity in time, and such as to cause the pin to perform a first opening displacement and, respectively, a second opening displacement, are supplied to the electroactuator. Between one injection and the next, at least one among the following quantities is varied as a function of operating parameters of the engine: duration of at least one among the electrical commands; number of the electrical commands; and distance in time between the electrical commands.

42 Claims, 4 Drawing Sheets

(56) References Cited

U.S. PATENT DOCUMENTS

| | | | | |
|---|---|---|---|---|
| 4,776,518 | A * | 10/1988 | Yamamoto | 239/533.4 |
| 4,852,808 | A * | 8/1989 | Yamamoto | 239/533.3 |
| 4,958,610 | A | 9/1990 | Yamamoto et al. | |
| 5,101,797 | A | 4/1992 | Stürz et al. | |
| 5,893,350 | A | 4/1999 | Timms | |
| 6,059,204 | A | 5/2000 | Augustin | |
| 6,415,762 | B1 | 7/2002 | Hafner et al. | |
| 6,422,209 | B1 | 7/2002 | Mattes | |
| 6,491,016 | B1 | 12/2002 | Buratti | |
| 6,761,325 | B2 * | 7/2004 | Baker et al. | 239/533.3 |
| 7,059,295 | B2 | 6/2006 | Blessing et al. | |
| 7,124,959 | B2 * | 10/2006 | Baker et al. | 239/5 |
| 7,131,428 | B2 | 11/2006 | Ricco et al. | |
| 2003/0089333 | A1 | 5/2003 | Duffy et al. | |
| 2004/0103874 | A1 | 6/2004 | Takahashi | |
| 2004/0237930 | A1 | 12/2004 | Kawamura et al. | |

FOREIGN PATENT DOCUMENTS

| | | | |
|---|---|---|---|
| EP | 0570986 | A2 | 11/1993 |
| EP | 0916842 | | 5/1999 |
| EP | 1657422 | | 5/2006 |
| FR | 2761113 | | 9/1998 |
| FR | 2761113 | A1 | 9/1998 |
| JP | 63-277841 | | 11/1988 |
| JP | 5-1609 | | 1/1993 |
| JP | 5-321732 | | 12/1993 |
| JP | 11-200932 | | 7/1999 |
| WO | WO02/20956 | | 3/2002 |

OTHER PUBLICATIONS

*Characteristics of a Common Rail Diesel Injection System under Pilot and Post Injection Modes*, Henein et al., SAE Technical Paper Series, 2002-01-0218, Detroit, Michigan, Mar. 2002, pp. 1-14, and title page.

*Diesel-engine Management, Common Rail*, 2nd Edition, Riesenberg et al., Robert Bosch GmbH, Stuttgart, Germany, 1999, pp. 1-2, 256-257, 264-270, 274-279.

* cited by examiner

ELECTROINJECTOR FOR CONTROLLING FUEL INJECTION IN AN INTERNAL-COMBUSTION ENGINE

Matter enclosed in heavy brackets [ ] appears in the original patent but forms no part of this reissue specification; matter printed in italics indicates the additions made by reissue.

This application is a continuation of prior U.S. patent application Ser. No. 11/109,789, filed Apr. 20, 2005 now U.S. Pat. No. 7,131,428, the entire disclosure of which is incorporated herein by reference.

This application also claims the priority of European Application No. 04425841.6, filed Nov. 12, 2004.

BACKGROUND AND SUMMARY OF THE INVENTION

The present invention relates to an electroinjector for controlling fuel injection in an internal-combustion engine.

In the engine sector, there is felt the need to make injections of fuel in which the instantaneous flow rate of injected fuel as a function of time comprises at least two stretches with levels that are substantially constant and different from one another, i.e., it can be represented schematically by a curve of the "stepwise" type. In particular, there is felt the need to inject an instantaneous flow of fuel having a plot in time T similar to the one represented by the curve of FIG. 1, in which there is present a first level L1 and a subsequent second level L2 higher than the first.

In an endeavour to obtain said flow-rate curve, it is known to provide injectors of a dedicated type, in which opening of the injection nozzle is caused by the lifting of two movable open/close pins co-operating with respective springs, or else by the lifting of a single movable open/close pin co-operating with two coaxial springs. In particular, the two springs are differently preloaded with respect to one another, and/or present characteristics of force/displacement that are different from one another, for opening the nozzle with lifts such as to approximate the required flow-rate curve.

The known solutions just described are far from altogether satisfactory in so far as it is somewhat complex to calibrate the springs in an optimal way to obtain a first level or step of flow rate smaller than the maximum flow rate from the nozzle and, hence, to approximate a flow-rate curve like the one of FIG. 1.

Furthermore, given the same pressure of supply of the fuel, once the law of lifting of the pins and, hence, the law of opening of the nozzle, has been established, the profile of flow rate of injected fuel is not modifiable as the operating conditions of the engine vary between the various injections performed by the injector.

In addition, it is somewhat difficult to obtain injectors with a profile of flow rate of injected fuel constant for the entire production.

The purpose of the present invention is to provide a method for controlling fuel injection in an internal-combustion engine which will enable the drawbacks set forth above to be overcome in a simple and economically advantageous way.

A method is provided for controlling fuel injection in an internal-combustion engine provided with an electroinjector comprising an electroactuator, and an atomizer, comprising an injection nozzle and a pin, which is movable along an opening stroke and a closing stroke for opening/closing said nozzle under the control of said electroactuator. The electroinjector performs dosage of the fuel by modulating in time opening of the pin of the atomizer according to the pressure of supply of the electroinjector itself.

The method is characterized by supplying to said electroactuator a first electrical command and at least a second electrical command that are sufficiently close to one another as to displace said pin with a profile of motion without any discontinuity in time, and such as to cause said pin to perform a first opening displacement and a second opening displacement, respectively.

BRIEF DESCRIPTION OF THE DRAWINGS

For a better understanding of the present invention, there now follows a description of a preferred embodiment, which is provided purely by way of non-limiting example, with reference to the attached drawings, in which.

DETAILED DESCRIPTION OF THE DRAWINGS

Figure 5:
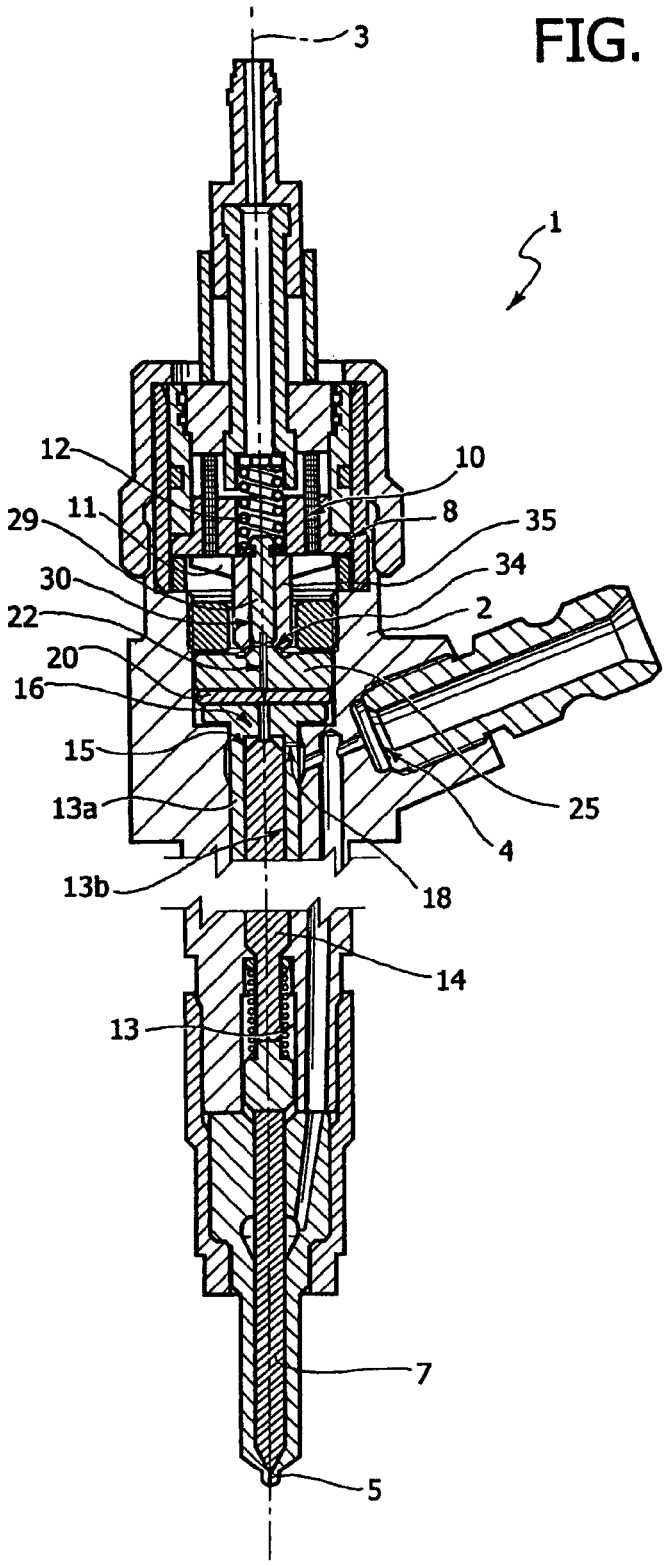
FIG. 5 shows, in cross section and with parts removed for reasons of clarity, an electroinjector for implementing the method of the present invention.

In FIG. 5, the reference number 1 designates, as a whole, an electroinjector (partially illustrated) of an internal-combustion engine, in particular a diesel-cycle engine (not illustrated).

The electroinjector 1 comprises an external structure or shell 2, which extends along a longitudinal axis 3, has a side inlet 4 designed to be connected to a system (not illustrated) for supply of fuel, and ends with a atomizer.

The atomizer comprises a nozzle 5 communicating with the inlet 4 and designed to inject the fuel into a combustion chamber, and an open/close pin 7 or needle, which is movable along an opening stroke and a closing stroke for opening/closing the nozzle 5 under the control of an electrically controlled actuator device 8, or electroactuator. The electroinjector 1 carries out dosage of the fuel by modulating in time opening of the pin 7 of the atomizer according to the pressure of supply of the electroinjector 1 itself, i.e., of the pressure at the inlet 4, as will emerge more clearly from the ensuing description.

The device 8 is preferably of the type comprising: an electromagnet 10; an anchor 11, which is axially slidable in the shell 2 under the action of the electromagnet 10; and a preloaded spring 12, which is surrounded by the electromagnet 10 and exerts an action of thrust on the anchor 11 in a direction opposite to the attraction exerted by the electromagnet 10.

The shell 2 has an axial seat 13, which is illustrated with parts removed for reasons of clarity in FIG. 5 and is obtained as a prolongation of the seat in which the pin 7 slides. An intermediate stretch of the seat 13 houses a body 13a having the shape of a glass turned upside down (partially illustrated), which is coupled to the shell 2 in a fixed position and in a fluid-tight way and has an axial seat 13b. The seat 13b houses a rod 14, which is axially slidable in the seats 13b and 13 and transmits an action of thrust to the pin 7 along a closing stroke under the action of the pressure of the fuel present in a control chamber 15.

The chamber 15 constitutes the end portion of the seat 13b, defines part of a control servo-valve 16 and communicates permanently with the inlet 4 through a passage 18 made in the shell 2 and in the body 13a for receiving fuel under pressure, so that modulation of opening and closing of the pin 7 exerted by the rod 14 is performed according to the pressure of supply of the fuel into the electroinjector 1.

The chamber 15 is axially delimited, on one side, by the rod 14 and, on the other, by an end portion of the body 13a, to which there is then set axially alongside a disk 20, fixed with respect to the shell 2 by means of an appropriate clamping system.

The servo-valve 16 further comprises a passage 22, which defines the outlet of the chamber 15, is substantially symmetrical with respect to the axis 3 and is made in the body 13a, in the disk 20, and in a distribution body 25 set in an intermediate axial position between the disk 20 and the device 8. The body 25 is fixed with respect to the shell 2, is axially coupled in a fluid-tight way to the disk 20 so that it bears thereupon, and ends with a stem or pin 29 delimited by a cylindrical side surface 30, dug into which is an annular chamber 34 in which there gives out the passage 22.

The radial outlet of the passage 22, defined by the chamber 34, is designed to be opened/closed by an open/close element defined by a sleeve 35, which is fitted on the stem 29 and is axially slidable under the action of the device 8 for varying the pressure present in the chamber 15 and, hence, for opening/closing the nozzle 5.

It is evident that, when the sleeve 35 closes the chamber 34, it is subjected to a resultant of pressure that is zero along the axis 3 by the fuel, with consequent advantages from the standpoint of stability of dynamic behaviour of the movable parts of the injector 1.

In particular, displacement of the pin 7 along the opening stroke, i.e., during lifting, and along the closing stroke is practically constant between one injection and the next in response to a given electrical command sent to the device 8. In other words, it is possible to correlate in a biunique and repeatable manner the position of the pin 7 with the electrical commands supplied to the device 8. The position of the pin 7 along the opening and closing strokes in response to an electrical command can be known via theoretical calculation, as a function of constructional parameters of the injector 1 (for example sections of passage of the servo-valve 16) and as a function of known operating parameters (for example, pressure of supply of the fuel into the inlet 4), or else experimentally by means of a "sample" injector on which appropriate sensors are mounted. At the same time, the opening section of the nozzle 5 and, hence, the instantaneous flow-rate pattern of the fuel can be determined in a unique way as a function of the axial displacement of the pin 7, in particular on the basis of the dimensions of the passages of the nozzle 5 itself and on the basis of the pressure of supply of the fuel.

Figure 2:
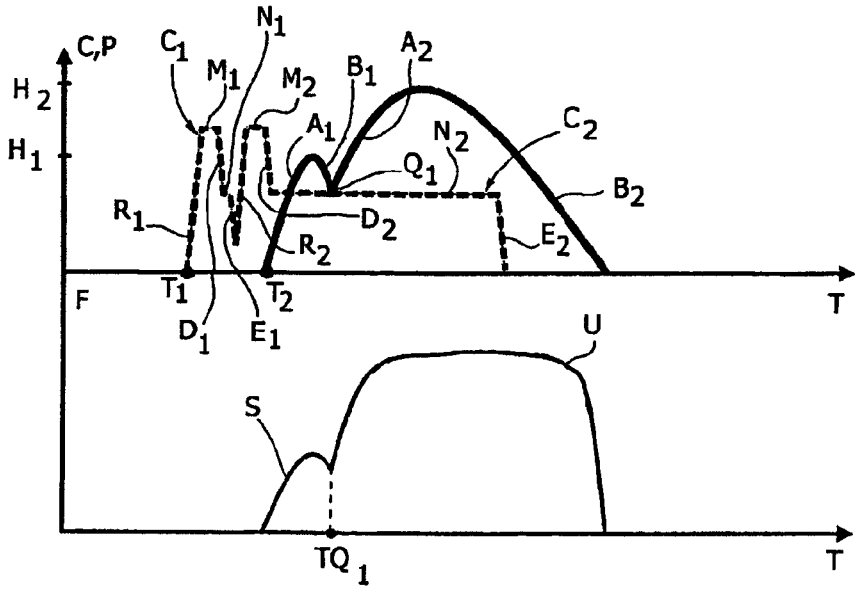
FIGS. 2 to 4 show graphs for operation of an electroinjector according to preferred embodiments of the method for controlling fuel injection in an internal-combustion engine of the present invention.
Figure 3:
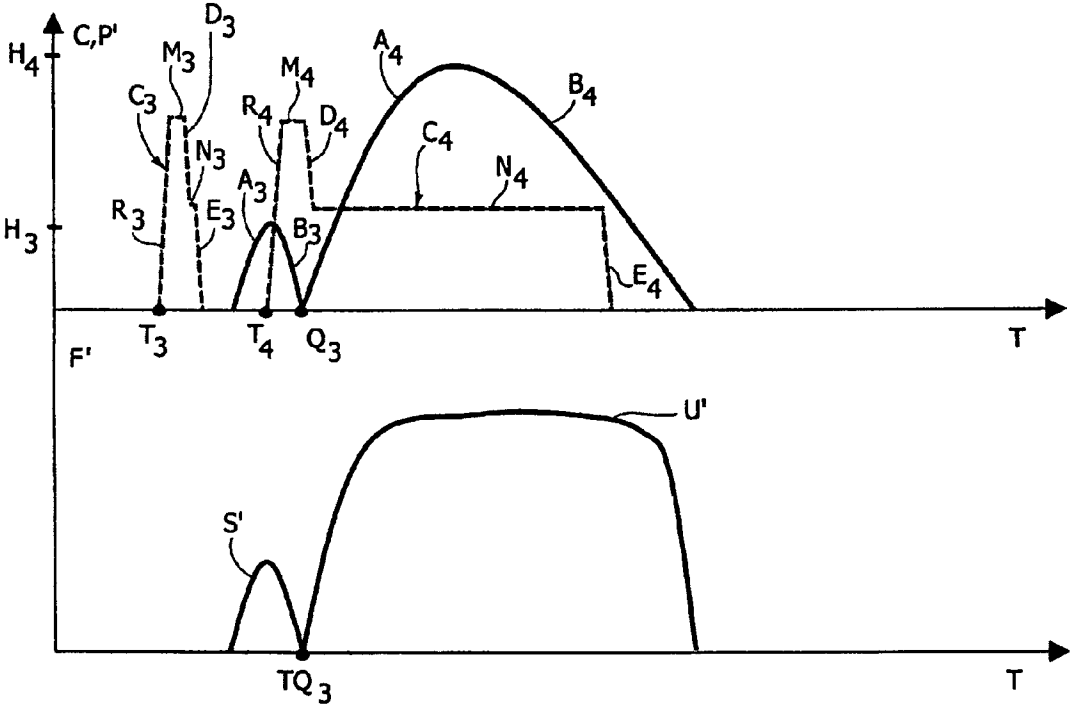
Figure 4:
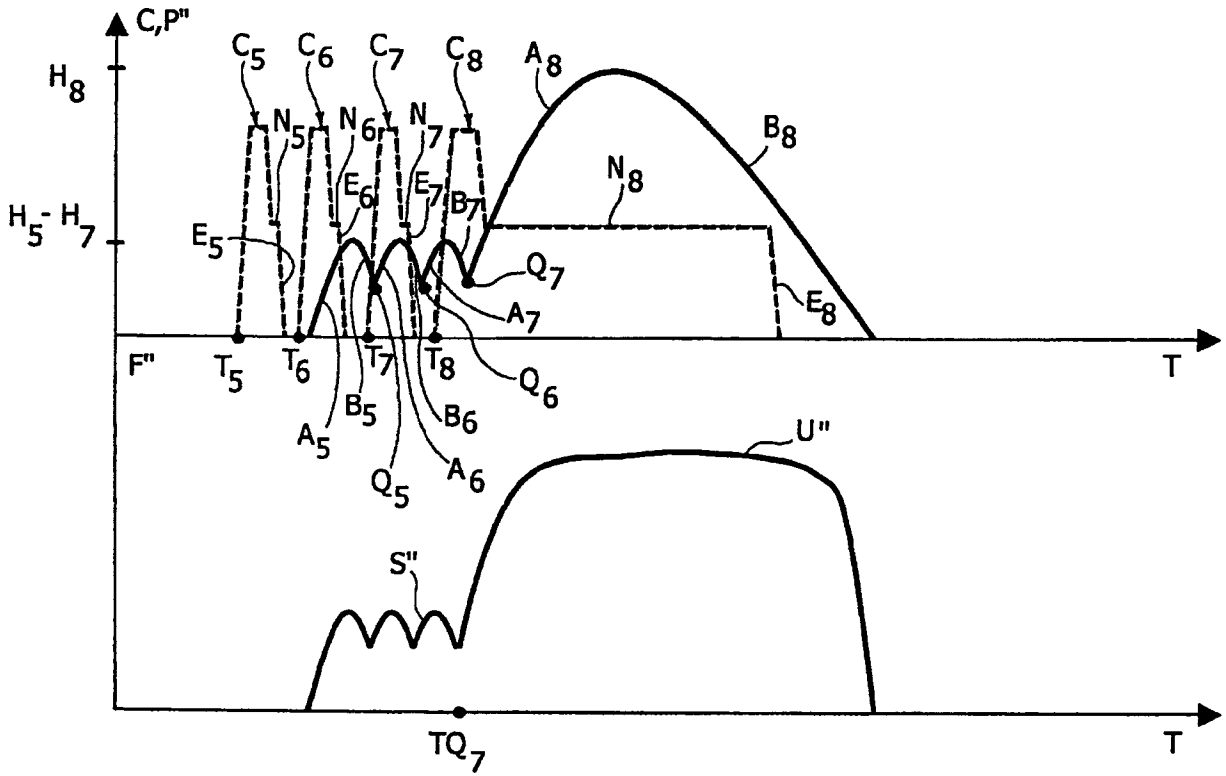

Each of FIGS. 2 to 4 illustrates: a corresponding top graph, which represents, as a function of time T, the waveforms C of the electrical commands supplied, according to the present invention, to the device 8 (dashed line) and the motion profile P of motion or plot of the axial position assumed by the pin 7 (solid line), in response to said commands, with respect to the ordinate "zero" in which the nozzle 5 is closed; and a corresponding bottom graph, which represents, as a function of time T, the curve F of the instantaneous flow rate of fuel (solid line) injected through the nozzle 5 and caused by the displacement of the pin 7 shown in the corresponding top graph.

In FIGS. 2-4, the commands are associated to respective reference numbers, which appear as subscripts near to the reference letters that designate the various parts of the corresponding graphs.

For reasons of clarity, by the term "command" is meant, in the present description and in the annexed claims, an electrical signal having a curve C that initially has a trailing edge or ramp R with a relatively fast initial increase. In the particular examples illustrated, the device 8 receives signals of electric current, the curve C of which presents, after the trailing edge R, a stretch M of holding around a maximum value, a stretch D of decrease down to an intermediate value, a stretch N of holding around said intermediate value, and a stretch E of final decrease.

According to the method of the present invention, to obtain a fuel injection, supplied to the device 8 are a first electrical command and at least a second electrical command, which are sufficiently close to one another as to displace the pin 7 with a profile P of motion without any discontinuity in time and such as to cause the pin 7 to perform a first and, respectively, a second opening displacement, or lifts, which are defined in the profile P by respective stretches A, increase up to relative-maximum values H, and are followed by respective closing displacements defined by decreasing stretches B of the profile P.

With reference to the example of FIG. 2, at the instant $T_1$ there is supplied a first command, the curve $C_1$ of which increases with the ramp $R_1$, remains then substantially constant (stretch $M_1$), then decreases along the stretch $D_1$, has a substantially constant stretch (stretch $N_1$), and finally decreases (stretch $E_1$).

The curve $C_1$ causes displacement of the pin 7 with a profile P comprising the increasing stretch $A_1$, up to the value $H_1$, and the decreasing stretch $B_1$. A second command is supplied at an instant $T_2$ such as to start the second lift, i.e., the stretch $A_2$, in a point $Q_1$ of the stretch $B_1$, before the pin 7 has reached the position of end-of-closing stroke of the nozzle 5. In particular, the instant $T_2$ is smaller than the theoretical instant in which the first command represented by the curve $C_1$ would reach a zero value. The curve $C_2$ has a stretch $N_2$ of duration longer than the stretch $N_1$, so that the lift of the pin 7 reaches a value $H_2$ greater than $H_1$, causing a degree or section of opening of the nozzle 5 greater than that reached at the end of the stretch $A_1$.

There then follows a closing displacement defined by the stretch $B_2$ up to complete closing of the nozzle 5, after which the pin 7 remains stationary until the subsequent injection.

Figure 1:
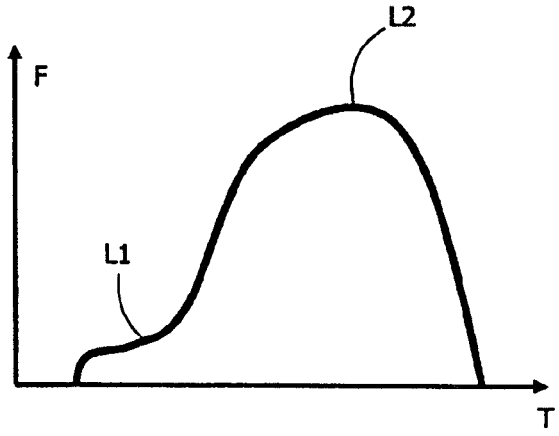
FIG. 1 shows a desired curve of instantaneous flow-rate of fuel as a function of time during one injection in an internal-combustion engine.

The curve F of the instantaneous flow rate obtained approximates in a satisfactory manner the desired curve of instantaneous flow rate illustrated in FIG. 1, in so far as it presents two consecutive portions S and U, which have respective maximum levels that are different from one another and respective mean levels that are different from one another and approximate the levels L1 and L2, respectively. It is evident that the instant in which the portion S ends and the portion U starts corresponds to the time abscissa of the point $Q_1$ ($TQ_1$).

According to the example of FIG. 3, the device 8 receives in succession two electrical commands, which are designated by the subscripts or reference numbers 3 and 4, respectively, and which cause the pin 7 to be displaced with a profile P' of motion (solid line) which is again without any discontinuity in time, i.e., without dwell times, between the stretch $B_3$ and the stretch $A_4$, but in a limit condition, i.e., supplying the second electrical command at an instant $T_4$ such as to start the second lift (stretch $A_4$) at a final point $Q_3$ of the stretch $B_3$, i.e., when the pin 7 has just reached the position of end-of-closing stroke. In particular, the instant $T_4$ is greater than the instant at which the stretch $E_3$ of the curve $C_3$ goes to zero. Albeit in a limit condition, the curve P of instantaneous flow rate obtained comprises two consecutive portions S' and U', which have respective maximum levels that are different from one another and respective mean levels that are different from one another and approximate still in a satisfactory manner the levels L1 and L2, respectively, of the desired instantaneous-flow curve of FIG. 1. It is evident that the instant at which the portion S' ends and the portion U' starts corresponds to the time abscissa of the point $Q_3$ ($QT_3$).

According to the example of FIG. 4, the device 8 receives four electrical commands in succession, which are designated, respectively, by the reference numbers or subscripts 5-8, and are supplied in respective instants $T_5$-$T_8$ sufficiently close to one another as to displace the pin 7 with a profile P" of motion that is once again without any discontinuity in time. In particular, the instants $T_6$-$T_8$ are greater than the instants at which the stretches $E_5$-$E_7$, respectively, go to zero. In a way similar to the example of FIG. 2, the stretches $A_6$-$A_8$ start in respective points $Q_5$-$Q_7$ of the stretches $B_5$-$B_7$ in which the pin 7 has not yet reached the position of end-of-closing stroke of the nozzle 5.

The values $H_5$-$H_7$ (relative-maximum values) reached by the pin 7 at the end of the first three lifts are substantially equal to one another, so that the relative maximum opening sections of the nozzle 5 are substantially the same as one another. The value $H_8$ reached at the end of the fourth and last lift (stretch $A_8$) is greater and causes a greater degree or section of opening, in so far as the stretch $N_8$ has a duration longer than the stretches $N_5$-$N_7$.

There is consequently obtained a curve F" of flow rate which approximates the desired flow-rate curve of FIG. 1 in a better way, in so far as it approaches more closely a "stepwise" curve. In particular, the curve F" comprises, up to an instant $TQ_7$ coinciding with the abscissa of the point $Q_7$, a portion S" which has three "peaks" and approximates the level L1 of the curve of FIG. 1 and, after the instant $TQ_7$, a portion U", which has mean and maximum levels greater than those of the portion S" and which approximates the level L2 of the curve of FIG. 1.

According to variants (not illustrated), it is possible to approximate curves of instantaneous flow rate of the "stepwise" type, in which there are present more than two levels, by causing the pin 7 to be displaced with more than two consecutive lifts up to values H that are different from one another, and/or to approximate curves of instantaneous flow rate, in which a level is followed by a lower level (instead of the levels L1 and L2 illustrated by way of example), by supplying electrical commands having appropriate durations and magnitudes.

Furthermore, according to the method of the present invention, for at least one injection, at least one of the following quantities is determined as a function of operating parameters of the engine:

duration of at least one of the electrical commands to be supplied to the device 8;

number of the electrical commands to be supplied to the device 8; and distance in time between the start of the electrical commands to be supplied to the device 8.

In particular, between one injection and the next, at least one among the following quantities is varied as a function of operating parameters of the engine, in particular as a function of the load:

duration of at least one of the electrical commands;

number of the electrical commands; and distance in time between the electrical commands.

In this way, it is possible to modulate the curve of the instantaneous flow rate between the various injections by varying the amplitude and/or duration and/or the number of the substantially constant levels of flow rate that it is desired to approximate.

From the foregoing description it is evident how it is possible to inject an instantaneous flow rate that approximates in an optimal manner flow-rate curves of the "stepwise" type and how this is obtained in a relatively simple way.

In fact, the control of injection according to the method described above does not require any calibration of mechanical components and/or injectors made in a dedicated manner.

Furthermore, the curve of the flow injected can be easily varied between one injection and the next so as to approximate as well as possible the desired flow-rate curve and optimize the efficiency of the engine according to the specific point of operation of the engine itself.

From the foregoing description, it is evident how the control method described can undergo modifications and variations that do not depart from the sphere of protection of the present invention.

In particular, the control method could be implemented with injectors that are different from the electroinjector 1 illustrated by way of example, but in which the displacement of the open/close pin of the nozzle is always performed as a function of the pressure of supply of the fuel and is repeatable in response to given electrical commands.

Furthermore, the device 8 could comprise a piezoelectric actuator, instead of an electromagnet.

Furthermore, the pin 7 could be displaced during lifting in one and the same injection for a number of times and/or by amounts different from those indicated by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electroinjector provided to control fuel injection in an internal combustion engine comprising:

an electroactuator having a solenoid operable by electrical commands to control a metering valve, an injection nozzle, and a pin which is movable so as to open and close the nozzle under control of the metering valve, wherein the solenoid is driven by a first electrical command with a first maximum command value and a second electrical command, supplied before the first electrical command reaches zero, with a second maximum command value, each of said first and second electric commands including an intermediate and constant command value below the first and second maximum command values, said electric commands having a duration as to displace the pin into first and second opening positions without any discontinuity in time, said opening positions defining corresponding degrees of opening of said injection nozzle, and wherein said second command is supplied so as to start displacement of the pin into said second opening position when said pin is closing the injection nozzle.

2. The electroinjector according to claim 1, wherein said second degree of opening is greater than said first degree of opening.

3. The electroinjector according to claim 1, wherein the first electrical command also has an intermediate and constant command value below the first and second maximum command values.

4. The electroinjector according to claim 3, wherein said intermediate and constant command value of the first electrical command is disposed between the maximum command values of said first and second electrical commands.

5. The electroinjector according to claim 1, wherein, after a fuel injection, at least one of a duration of one of the electrical commands, a number of the electrical commands, and a time between the electrical commands is varied as a function of engine load prior to another fuel injection.

6. The electroinjector according to claim 2, wherein, after a fuel injection, at least one of a duration of one of the electrical commands, a number of the electrical commands, and a time between the electrical commands is varied as a function of engine load prior to another fuel injection.

7. The electroinjector according to claim 3, wherein, after a fuel injection, at least one of a duration of one of the electrical commands, a number of the electrical commands, and a time between the electrical commands is varied as a function of engine load prior to another fuel injection.

8. The electroinjector according to claim 4, wherein, after a fuel injection, at least one of a duration of one of the electrical commands, a number of the electrical commands, and a time between the electrical commands is varied as a function of engine load prior to another fuel injection.

9. An electroinjector provided to control fuel injection in an internal-combustion engine comprising:

an electroactuator having a solenoid driven by electrical commands to control a metering valve; and an atomizer, the atomizer comprising an injection nozzle and a pin, which is movable along an opening stroke and a closing stroke for opening/closing said nozzle under the control of said metering valve, the electroinjector performing dosage of the fuel by modulating in time opening of the pin of the atomizer according to the pressure of supply of the electroinjector itself;

wherein the solenoid is driven by at least one first electrical command with at least one first maximum command value and a second electrical command with a second maximum command value, each of said first and second electric commands including an intermediate and constant command value below the first and second maximum command values, said electric commands having a duration as to displace said pin with a profile of motion without any discontinuity in time, said commands providing opening positions defining corresponding degrees of opening of said injection nozzle;

wherein said pin performs a first opening displacement and a second opening displacement respectively based on the commands supplied;

wherein said pin performs a third opening displacement in succession to said first and second opening displacements; and wherein said second electric command is supplied so as to start the second opening displacement of the pin when the pin is closing the injection nozzle.

10. The electroinjector according to claim 9, wherein electrical commands are supplied in such a way as to cause, at the end of said opening displacements, a first degree, a second degree, and a third degree of opening to be reached, and wherein said first and second degrees of opening are smaller than said third degree of opening.

11. The electroinjector according to claim 10, wherein said at least one first maximum command value includes plural values occurring consecutively with respect to one another and prior to said second maximum command value.

12. The electroinjector according to claim 10, wherein said electrical commands are supplied in such a way that said first and second degrees of opening are equal to one another.

13. An electroinjector provided to control fuel injection in an internal-combustion engine comprising:

an electroactuator;

an atomizer having an injection nozzle supplied with fuel at high pressure; and a pin displaceable axially for opening and closing the nozzle so that the instantaneous fuel flow rate is determined by the axial displacement of the pin;

wherein said pin is movable along opening strokes and relevant closing strokes under control of said electroactuator;

wherein electric commands are modulated in time for operating said electroactuator with a dosage according to the pressure of supplied fuel, each of the electric commands including a maximum holding stretch at a maximum value and intermediate holding stretch at an intermediate value;

wherein a first of the electric commands has a predetermined duration of said intermediate holding stretch to cause said pin to perform a first opening stroke reaching a first maximum value;

wherein at least a second of the electric commands has a corresponding duration of said intermediate stretch to cause said pin to perform a second opening stroke reaching a second maximum value greater than said first maximum value; and wherein the second electric command is supplied at an instant so as to start the second opening stroke not later than the instant at which the pin terminates the first closing stroke.

14. The electroinjector according to claim 13, wherein said second electric command is supplied at an instant not later than when said first electrical command reaches zero to start said second opening stroke when said pin is displacing along the first closing stroke.

15. The electroinjector according to claim 13, wherein said modulation in time is determined as a function of operating parameters of said engine by varying at least one of a duration of at least one of the electric commands, and a distance in time between said first electric command and said second electric command.

16. The electroinjector according to claim 13, wherein at least a third electrical command sufficiently close to said first and second electrical commands is supplied to said electroactuator so as to displace said pin with a profile of motion so as to cause the pin to perform a third opening stroke in succession between said first opening stroke and said second opening stroke to start said second and third opening strokes when said pin is displacing respectively along the first and second closing strokes.

17. The electromagnet according to claim 16, wherein said third electrical command is supplied in such a way as to cause, at the end of the third opening stroke, a third maximum value of opening smaller than the maximum value of said second opening stroke.

18. The electroinjector according to claim 17, wherein said first electrical command and said third electrical command are supplied in such a way that said first maximum value of opening and said third maximum value of opening are equal to one another.

19. An electroinjector provided to control fuel injection in an internal-combustion engine comprising:

an electroactuator;

an atomizer having an injection nozzle supplied with fuel at high pressure; and a pin displaceable axially for opening and closing said nozzle so that the instantaneous fuel flow rate is determined by the axial displacement of said pin;

wherein said pin is movable along opening strokes and relevant closing strokes under control of said electroactuator;

wherein electric commands are modulated in time for operating said electroactuator with a dosage according to pressure of supplied fuel, each of said electric commands including a maximum holding stretch at a maximum value and an intermediate holding stretch at an intermediate value;

wherein a first of said electric commands has a predetermined duration of said intermediate holding stretch to cause said pin to perform a first opening stroke reaching a first maximum value;

wherein at least a second of said electric commands has a corresponding duration of said intermediate stretch to cause said pin to perform a second opening stroke reaching a second maximum value greater than said first maximum value;

wherein said second electric command is supplied at an instant before said first electrical command reaches zero so as to start said second opening stroke when said pin is displacing along the first closing stroke; and wherein the time modulation is determined as a function of operating parameters of said engine by varying at least one of a duration of at least one of the electric commands and a distance in time between the first electric command and the second electric command.

20. The electroinjector according to claim 19, wherein at least a third electrical command sufficiently close to said first and second electrical commands is supplied to said electroactuator so as to displace said pin with a profile of motion so as to cause the pin to perform a third opening stroke in succession between said first opening stroke and said second opening stroke to start said second and third opening strokes when said pin is displacing respectively along the first and second closing strokes.

21. The electromagnet according to claim 19, wherein said third electrical command is supplied in such a way as to cause, at the end of the third opening stroke, a third maximum value of opening smaller than the maximum value of said second opening stroke.

22. The electroinjector according to claim 21, wherein said first electrical command and said third electrical command are supplied in such a way that said first maximum value of opening and said third maximum value of opening are equal to one another.

*23. A fuel electroinjector for a fuel injection system for an internal combustion engine, the fuel electroinjector being operable by a first electrical command and a subsequent second electrical command to respectively cause the fuel electroinjector to perform a pilot fuel injection and a main fuel injection in an engine cylinder, wherein the first and second electrical commands are spaced apart in time by an electrical dwell time, and the main fuel injection starts without interruption with respect to the pilot fuel injection when the pilot fuel injection ends.*

*24. The fuel electroinjector according to claim 23, wherein the main fuel injection starts exactly when the pilot fuel injection ends.*

*25. The fuel electroinjector according to claim 23, wherein a main quantity of fuel injected during the main fuel injection differs from a pilot quantity of fuel injected during the pilot fuel injection.*

*26. The fuel electroinjector according to claim 25, wherein the main quantity of fuel is larger than the pilot quantity of fuel.*

*27. The fuel electroinjector according to claim 23, further comprising:*

*a fuel atomizer having a fuel injection nozzle, and a pin movable along opening and closing strokes to open and close the fuel injection nozzle; and*

*an electrically-operable fuel metering servo valve operable to control the fuel atomizer by the first electrical command;*

*wherein the electroactuator is operable by the first electrical command to cause the fuel atomizer pin to perform a first opening displacement for the pilot fuel injection followed by a first closing displacement, ending when the fuel atomizer pin closes the fuel injection nozzle, so as to result in a first opening degree of the fuel injection nozzle, and by the second electrical command to cause the atomizer pin to perform a second opening displacement for the main fuel injection followed by a second closing displacement so as to result in a second opening degree of the fuel injection nozzle; and*

*wherein the second opening displacement starts at an end of the first closing displacement so as to result in a motion profile without interruption between the first closing displacement and the second opening displacement.*

*28. The fuel electroinjector according to claim 27, wherein the first opening degree differs from the second opening degree.*

*29. The fuel electroinjector according to claim 28, wherein the first opening degree is lower than the second opening degree.*

*30. The fuel electroinjector according to claim 23, wherein each of the electrical commands is an electrical current that changes with respect to time so as to define a curve having a trailing edge rising from a minimum value to a maximum value, a stretch holding at said maximum value, and a forward edge falling from the intermediate value toward said minimum value.*

*31. The fuel electroinjector according to claim 30, wherein said curve further has another forward edge falling from the maximum value to an intermediate value, and another holding stretch holding at said intermediate value.*

*32. The fuel electroinjector according to claim 23, wherein the fuel injection system is a common rail fuel injection system.*

*33. A fuel injection system for an internal combustion engine having a fuel electroinjector comprising:*

*a fuel electroinjector, and*

*an electronic control unit to supply the fuel electroinjector with a first electrical command and a second electrical command to respectively cause the fuel electroinjector to perform a pilot fuel injection and a main fuel injection in an engine cylinder,*

*wherein the first and second electrical commands are spaced apart in time by an electrical dwell time, and the main fuel injection starts without interruption with respect to the pilot fuel injection when the pilot fuel injection ends.*

*34. The fuel injection system according to claim 33, wherein the main fuel injection starts exactly when the pilot fuel injection ends.*

*35. The fuel injection system according to claim 33, wherein a main quantity of fuel injected during the main fuel injection differs from a pilot quantity of fuel injected during the pilot fuel injection.*

*36. The fuel injection system according to claim 35, wherein the main quantity of fuel is larger than the pilot quantity of fuel.*

*37. The fuel injection system according to claim 33, further comprising:*

*a fuel atomizer having a fuel injection nozzle, and a pin movable along opening and closing strokes to open and close the fuel injection nozzle; and*

*an electrically-operable fuel metering servo valve operable to control the fuel atomizer by the first electrical command;*

*wherein the electroactuator is operable by the first electrical command to cause the fuel atomizer pin to perform a first opening displacement for the pilot fuel injection followed by a first closing displacement, ending when the fuel atomizer pin closes the fuel injection nozzle, so as to result in a first opening degree of the fuel injection nozzle, and by the second electrical command to cause the atomizer pin to perform a second opening displacement for the main fuel injection followed by a second closing displacement so as to result in a second opening degree of the fuel injection nozzle; and*

*wherein the second opening displacement starts at an end of the first closing displacement so as to result in a motion profile without interruption between the first closing displacement and the second opening displacement.*

*38. The fuel injection system according to claim 37, wherein the first opening degree differs from the second opening degree.*

*39. The fuel injection system according to claim 38, wherein the first opening degree is lower than the second opening degree.*

*40. The fuel injection system according to claim 33, wherein each of the electrical commands is an electrical current that changes with respect to time so as to define a curve having a trailing edge rising from a minimum value to a maximum value, a stretch holding at said maximum value, and a forward edge falling from the intermediate value toward said minimum value.*

*41. The fuel injection system according to claim 33, wherein said curve further has another forward edge falling from the maximum value to an intermediate value, and another holding stretch holding at said intermediate value.*

*42. The fuel injection system according to claim 33, wherein the fuel injection system is a common rail fuel injection system.*

* * * * *